United States Patent
Donnelly

(10) Patent No.: US 7,620,968 B2
(45) Date of Patent: *Nov. 17, 2009

(54) CHANNELS AND SERVICES DISPLAY

(75) Inventor: Daniel B. Donnelly, Danville, CA (US)

(73) Assignee: Starsight Telecast, Inc., Los Angeles, CA (US)

( * ) Notice: Subject to any disclaimer, the term of this patent is extended or adjusted under 35 U.S.C. 154(b) by 405 days.

This patent is subject to a terminal disclaimer.

(21) Appl. No.: 10/192,084

(22) Filed: Jul. 9, 2002

(65) Prior Publication Data

US 2002/0199192 A1 Dec. 26, 2002

(51) Int. Cl.
*G06F 3/00* (2006.01)
*G06F 13/00* (2006.01)
*H04N 5/445* (2006.01)

(52) U.S. Cl. .......................... 725/50; 725/44

(58) Field of Classification Search .................. 725/39, 725/40, 44, 48, 50, 52, 58
See application file for complete search history.

(56) References Cited

U.S. PATENT DOCUMENTS

| | | | |
|---|---|---|---|
| 5,699,125 A | 12/1997 | Rzeszewski et al. | |
| 5,867,226 A | 2/1999 | Wehmeyer et al. | |
| 5,945,987 A * | 8/1999 | Dunn | 715/718 |
| 5,995,092 A | 11/1999 | Yuen et al. | |
| 6,151,059 A | 11/2000 | Schein et al. | |
| 6,172,677 B1 * | 1/2001 | Stautner et al. | 715/716 |
| 2003/0208756 A1 * | 11/2003 | Macrae | 725/34 |

FOREIGN PATENT DOCUMENTS

WO WO 98/17064 * 4/1998

OTHER PUBLICATIONS

US 6,118,443, 09/2000, Allison et al. (withdrawn)

* cited by examiner

*Primary Examiner*—Ngoc K Vu
(74) *Attorney, Agent, or Firm*—Ropes & Gray LLP

(57) ABSTRACT

The availability of a new information service is publicized by displaying an icon in an EPG when the presence of a new information service is detected. A list of new services is then displayed responsive to a user command. When one of the new services is displayed instead of the list.

31 Claims, 11 Drawing Sheets

FIG. 1E
CHANNEL DATA TABLE

| Offset | 7 | 6 | 5 | 4 | 3 | 2 | 1 | 0 | |
|---|---|---|---|---|---|---|---|---|---|
| 0x00 | | | TYPE=0x01 | | | | | | |
| 0x01 | | | | NBR BLOCKS | | | | | |
| 0x02 | | | | 0x00 | | | | | |
| 0x03 | | | | NBR CHANNELS | | | | | 0x00 |
| 0x04 | MSB | | | CHANNEL ID | | | | LSB | |
| 0x06 | DPF | ICF | NDF | | | NF | TMSB | | 0x02 |
| 0x07 | | | | TUNE CHANNEL NBR | | | | | 0x03 |
| 0x08 | | | | TRANSPONDER NBR | | | | | 0x04 |
| 0x09 | | | | SATELLITE NBR | | | | | 0x05 |
| 0x0A | SOURCE | | CHANNEL TYPE | | | | NMSB | | 0x06 |
| 0x0B | | | | NATIVE CHANNEL NBR | | | | | 0x07 |
| 0x0C | | | | NAME MASK BITS | | | | | 0x08 |
| 0x0D | | | | FAVORITES LINK | | | | | 0x09 |
| 0x0E | MSB | | SHOWLIST HANDLE TABLE HANDLE | | | | | LSB | 0x0A |
| 0x10 | MSB | | | NAME AFFILIATION STRING | | | | | 0x0C |
| | | | | | | | | LSB | |
| 0x18 | MSB | | DUPLICATE CHANNELS HANDLE | | | | | LSB | 0x14 |

FIG. 1F
SHOW LIST

| Offset | 7 | 6 | 5 | 4 | 3 | 2 | 1 | 0 | |
|---|---|---|---|---|---|---|---|---|---|
| 0x00 | | | TYPE=0x02 | | | | | | |
| 0x01 | | | | NBR BLOCKS | | | | | |
| 0x02 | | | | VERSION | | | | | |
| 0x03 | MSB | | | START TIME GMT | | | | | |
| | | | | | | | | LSB | |
| 0x07 | | | START DELIMITER=0xEE | | | | | | |
| 0x08 | RESV | | | | PPV | GRPF | DIDF | DMYF | 0x00 / 0x01 |
| 0x09 | | | | DURATION | | | | | 0x02 |
| 0x0A | MSB | | SHOW TITLE HANDLE | | | | | LSB | |
| 0x0C | MSB | | SHOW DESCRIPTION HANDLE | | | | | LSB | 0x04 |
| 0x0E | MSB | | | GROUP ID | | | | LSB | 0x06 |
| ... | | | | END DELIMITER=0xFF | | | | | |

FIG. 1J

THEME SUBCATEGORY TABLE

| Offset | 7 | 6 | 5 | 4 | 3 | 2 | 1 | 0 |
|---|---|---|---|---|---|---|---|---|
| 0x00 | | | | TYPE=0x06 | | | | |
| 0x01 | | | | NBR BLOCKS | | | | |
| 0x02 | | | | THEME CATEGORY ID | | | | |
| 0x03 | | | | NBR THEME SUBCATEGORIES | | | | |
| 0x04 | | | | THEME SUBCATEGORY ENTRY LENGTH(m) | | | | |
| 0x05 | | | | ATTRIBUTES FLAG | | | | |
| 0x06 | | | | NBR THEME INDECIES(k) | | | | |
| 0x07 | MSB | | | THEME ID 1 | | | | LSB |
| 0x09 | MSB | | | THEME ID 2 | | | | LSB |
| ... | | | | ... | | | | |
| 6+2k | MSB | | | THEME ID k | | | | LSB |
| 8+2k | MSB | | | | | | | LSB |
| ... | | | | THEME SUBCATEGORY NAME | | | | |
| 0xm | | | | | | | | LSB |

FIG. 1I

THEME CATEGORY TABLE

| Offset | 7 | 6 | 5 | 4 | 3 | 2 | 1 | 0 |
|---|---|---|---|---|---|---|---|---|
| 0x00 | | | | TYPE=0x05 | | | | |
| 0x01 | | | | NBR BLOCKS | | | | |
| 0x02 | | | | VERSION | | | | |
| 0x03 | | | | NBR THEME CATEGORIES | | | | |
| 0x04 | | | | THEME CATEGORY ID | | | | |
| 0x05 | | | | ATTRIBUTES FLAG | | | | |
| 0x06 | MSB | | | THEME SUBCATEGORY HANDLE TABLE | | | | LSB |
| 0x07 | | | | | | | | |
| 0x08 | | | | CATEGORY NAME LENGTH | | | | |
| 0x09 | MSB | | | | | | | |
| ... | | | | THEME CATEGORY NAME | | | | |
| 0xM | | | | | | | | |

CHANNELS AND SERVICES DISPLAY

CROSS REFERENCE TO RELATED APPLICATIONS

This application claims priority of U.S. patent application Ser. No. 09/222,107 filed Dec. 29, 1998, which claims the benefit of U.S. provisional application 60/068,897, filed Dec. 29, 1997.

BACKGROUND OF THE INVENTION

The present invention relates to a system for providing television schedule information, and more particularly to a television schedule information guide with capability for notifying and alerting a viewer when new or previously unavailable channels and services become available.

The number of television channels available to a user has grown dramatically within the last decade, primarily due to the availability of cable and direct broadcast satellite systems. As the number of programs of potential interest to the viewer has increased, a variety of electronic program guides have been developed to help the viewer select programs of particular interest. For example, commonly assigned U.S. Pat. Nos. 4,706,121 and 5,353,121 each describes schedule information processing systems which provide the viewer with a convenient way to select programs based on viewer supplied selection criteria.

With the advent of digital television, the number of channels available is increasing dramatically. For example, the typical analog cable service provides about 60 channels. In contrast, digital television service providers will be able to deliver on the order of 150 or more channels. Many of the new channels will likely not be recognized by a viewer, nor will it be easy for a viewer to identify a channel as being new, unless there is a simple and convenient way to inform and alert the viewer to new channels and services. Hence, it is desirable to provide a viewer with the ability to simply and conveniently determine newly available channels and services. It is also desirable to provide a viewer with a description of the new channels or services including the type of subject matter typically presented thereon.

SUMMARY OF THE INVENTION

The present invention is directed to a television schedule information system, and more particularly to a system with the capability for notifying and alerting a viewer when new or previously unavailable channels and services become available.

In one embodiment, the cable and direct satellite service providers supply the television schedule system operator with information regarding which channels have recently been added to viewer service packages. Based on the information provided by the service providers, the system displays a list of the newly added channels for the viewers perusal. Preferably, the new channels and services list is displayed when the user selects a new services icon on an interactive schedule guide, however, the new channels list may be automatically displayed when the schedule guide is accessed. The system also provides the viewer with the ability to obtain a description about each new channel or service, or to tune directly to a new channel from the description screen, for example.

These and other embodiments of the present invention, along with many of its advantages and features, are described in more detail in the text below and in the attached figures.

BRIEF DESCRIPTION OF THE DRAWINGS

FIG. 1E illustrates an exemplary channel data table;

FIG. 1F illustrates an exemplary show list table;

FIG. 1I illustrates an exemplary theme category table;

FIG. 1J illustrates an exemplary theme sub category table;

DESCRIPTION OF THE PREFERRED EMBODIMENT

A. Overview of the System

Figure 1A:
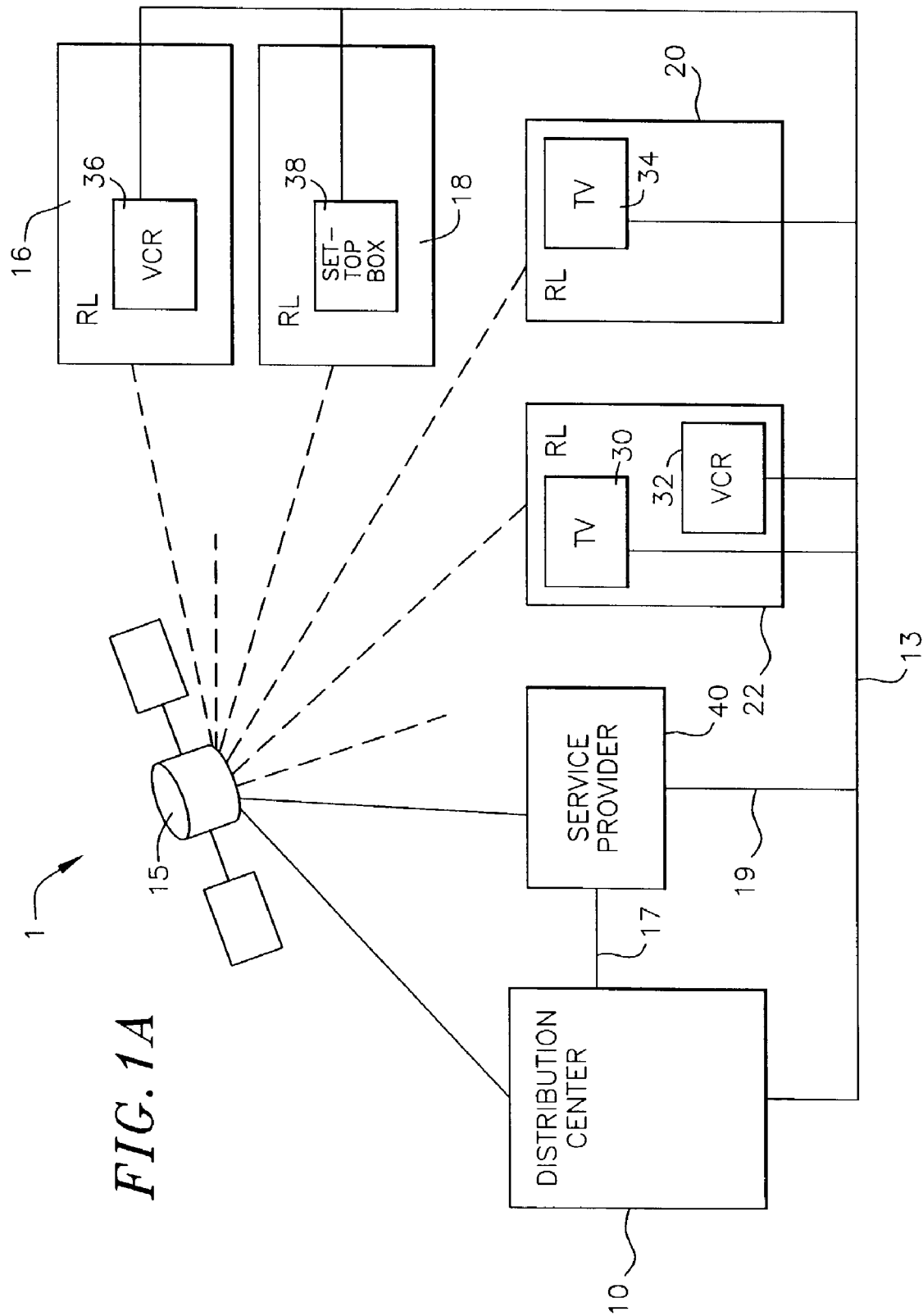
FIG. 1A illustrates a preferred embodiment of a system on which a program schedule guide according to the present invention may be displayed.

FIG. 1A illustrates a preferred embodiment of television/computer system 1 that displays a program schedule guide according to the present invention. As shown, system 1 includes a distribution center 10 and multiple receiving locations. Distribution center 10 compiles data for a data-stream. In a preferred embodiment, this data-stream is broadcast to receiving locations 16, 18, 20 and 22. Several methods are available for broadcasting the data-stream from distribution center 10 to receiving locations 16-22. For example, satellite 15 may broadcast this data-stream within the vertical blanking interval (VBI) of a television channel (e.g., PBS) or a dedicated channel to receiving locations 16, 18, 20 and 22. Alternatively, the data may also be broadcast out of band, i.e., using non channel specific mechanisms. In another preferred embodiment, the data-stream is provided to receiving locations 16, 18, 20 and 22 via transmission system 13. Transmission system 13 may be, for example, optical fiber, coax cable, telephone line, over the air television broadcast, or the like.

In yet another embodiment, peripheral devices, which are located within the receiving locations, receive the data-stream from, for example, a local service provider 40. Service provider 40 receives the data-stream from distribution center 10 via line 17, and broadcasts the data-stream to the receiving peripheral devices via satellite 15 (or another satellite), or via lines 19 and 13. The receiving peripheral devices may be televisions 30, televisions 34, VCRs 32, VCRs 36, and/or cable, satellite IRD, web-browser or set-top boxes 38.

Information in the data-stream includes television schedule information and information about new channels and services. Software applications located within the peripheral devices utilize the schedule information provided in the data-stream to generate a schedule guide.

Figure 1B:
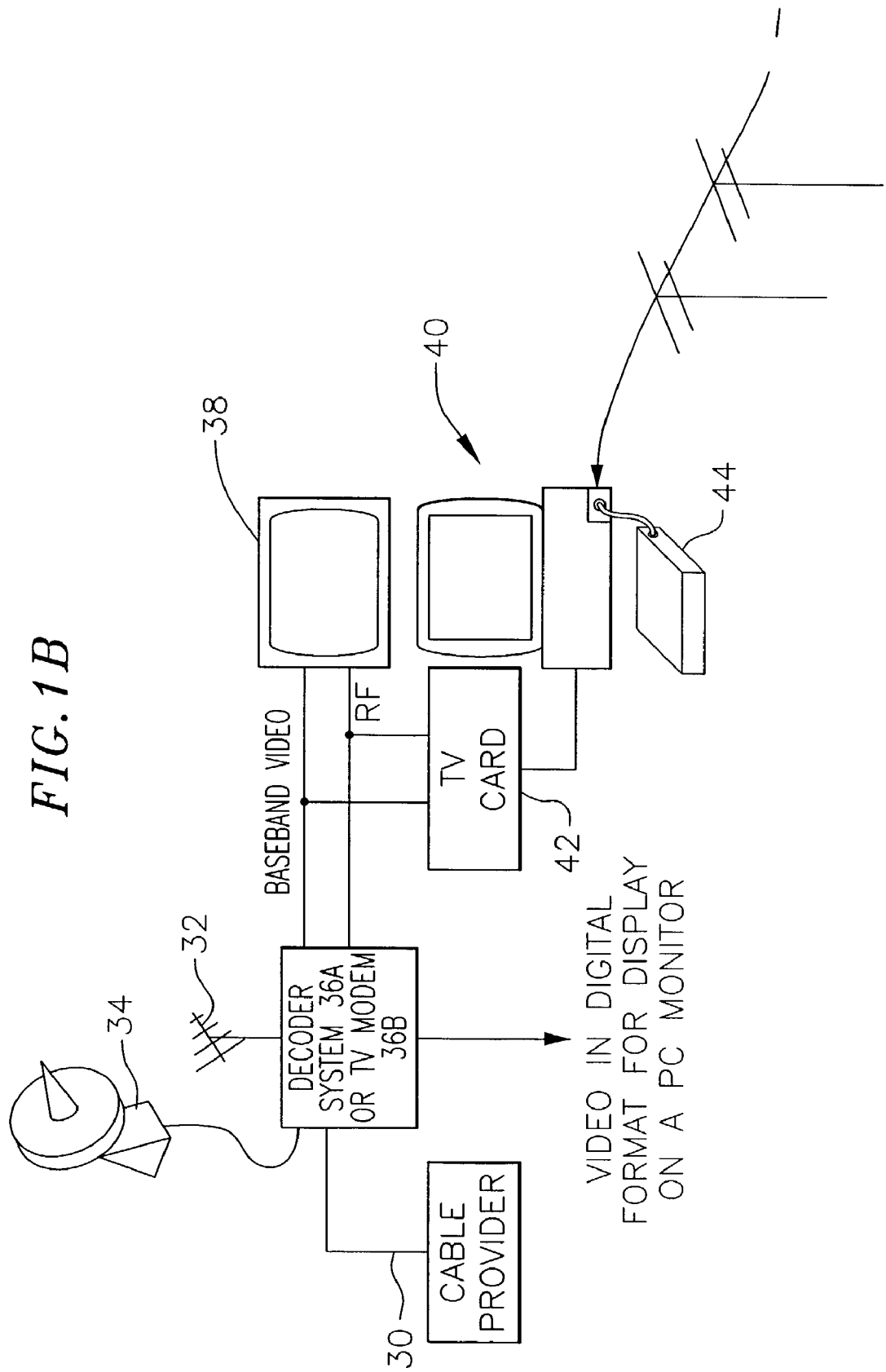
FIG. 1B illustrates another representation of the TV system.

In a preferred embodiment, the electronic program guide of the present invention may be implemented either on a personal computer, a PCTV, a television connected to a set-top box, or a television including a custom board. However, the invention is not limited to any particular hardware configuration and will have increased utility as new combinations of computers and television systems are developed. In the following, any of the above will be referred to as a "TV system". A block diagram of a representative TV system is depicted in FIG. 1B. Details of implementation are not depicted because the invention is not limited to any particular TV system.

As is well known, the picture to be displayed on a TV maybe transmitted as an analog signal, for example according to the NTSC standard utilized in the United States, or as a digital signal modulated onto an analog carrier. The signals may be received over a cable 30, or via an antenna 32 or satellite dish 34. Typically, television sets are designed to receive analog signals and computer display devices are designed to display pictures encoded in a digital format. However, decoder system 36A can convert the digital data to an analog signal for display on a television set, and TV modem 36B can format analog TV signals for display on a PC monitor.

In FIG. 1B, analog or digital TV signals, received via cable, antenna, or satellite dish, are provided to either a television 38 or to a PC (not shown). If the signal is from a digital broadcast service, then a decoder converts the signal to baseband video and audio or channel ¾ RF. If the signal is an analog signal, it is passed through as a live video output. The television, depending on its configuration, receives selected ones of the outputs and displays the received program.

If the TV is a PCTV 40, it typically includes a TV card 42, connected to either live video, baseband video, or channel ¾ output. TV card 42 digitizes the video image and displays the video image in a resizeable window on the computer monitor. PCTV 40 may also be coupled to land telephone lines by a modem 44. If the received signal is an analog TV signal, the TV card of the PCTV digitizes the analog signal and extracts included information from the vertical blanking intervals. On the other hand, if the signal is a digital signal, separate audio, video, VBI (information such as closed caption, teletext, and program related information), program guide, and conditional access information are provided as separate bit-streams.

The video and audio bit-streams for programs are converted to a format for display and the program guide information is processed to form the program guide database. The processor, executing software stored in memory, generates interactive electronic program guide images, as well as images of received programs. The guide can be used to interact with and control programs displayed in the window.

A television system configured to display an electronic program guide such as a guide provided by StarSight telecast includes an on-screen display controller and other hardware described below. If a standard analog broadcast signal is received, program guide data is extracted from the VBl by a VBI data slicer and processed to form a program database. If a DBS digital signal is received, either from a satellite or cable, VBI and program data are provided in separate bit streams.

The program guide images are either generated locally or remotely and provided to an on-screen display controller. Interactivity is provided via a remote control unit, for example. Alternatively, the program guide can be displayed on a computer monitor that interactively controls the television set through, for example, an IR interface including an IR blaster to generate IR codes to control the television and/or a VCR.

If the electronic guide database is generated locally, the system for creating the electronic programming guide must receive television schedule information and process the received information to create a database. Thus, the system requires, a data reception unit, a processor, memory to store program code and a database, an on-screen display generator (OSD), and a control interface for tuning to selected channels.

In one embodiment, the schedule information is transmitted as a set of short commands of specified formats. Different commands communicate information such as a show schedule for a given channel, the title of each show in the schedule, descriptions and information attributes about each show in the channel. Thus, information for a show to be broadcast at a particular time is transmitted in several commands. ID numbers in the commands facilitate organizing the information into a relational database utilizing database engine (DBE) software stored in memory and executed by the processor.

Figure 1C:
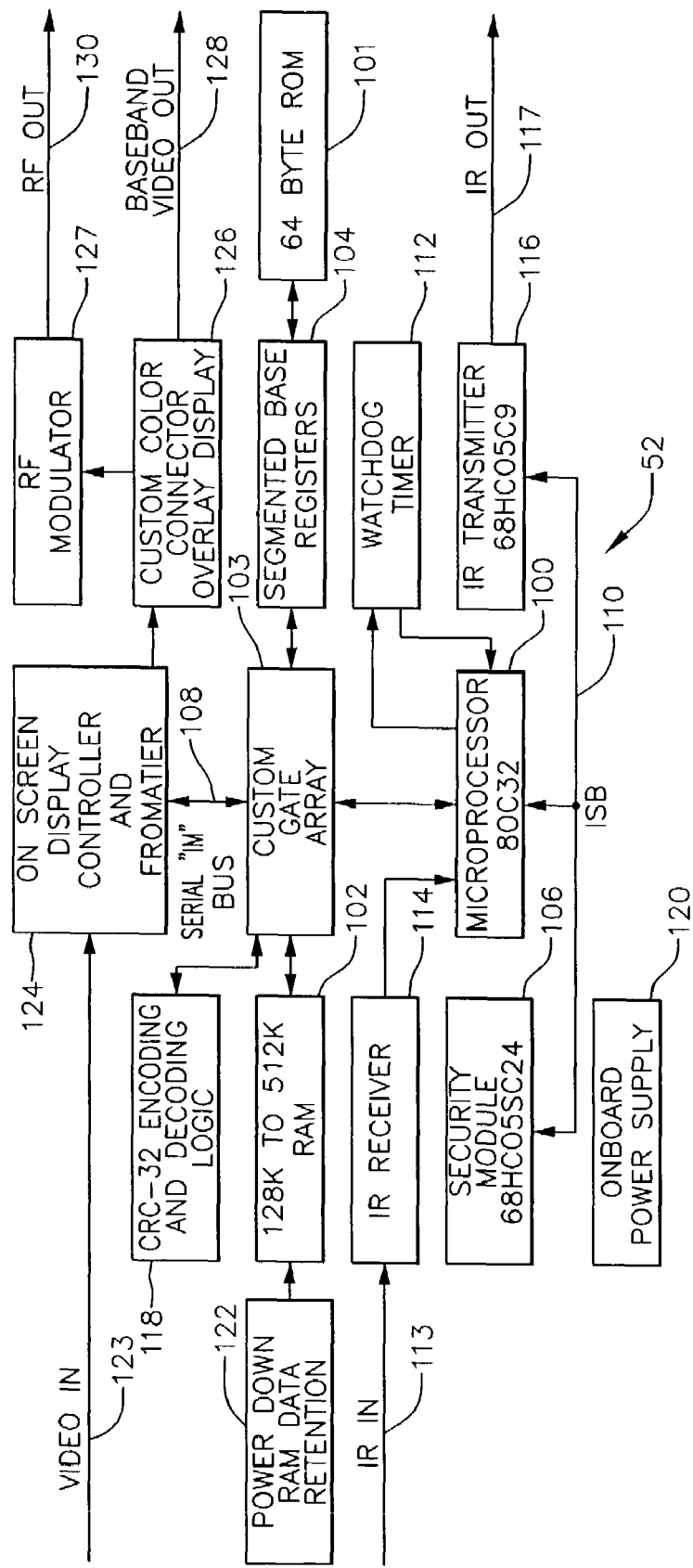
FIG. 1C is a block diagram of an embodiment of the electronic hardware unit utilized to perform the electronic on-screen schedule display and other functions.

In another embodiment, a board is included at a viewer's television set and the database is stored locally and commands are transmitted in the VBIs of programming on a designated channel, for example PBS. An example of a board for receiving program guide information, generating a program guide database, displaying the program guide, and interactively controlling the program guide is depicted in FIG. 1C. The commands are transmitted to the board in the vertical blanking intervals of programming broadcast on a designated channel. Alternatively, the commands could be transmitted to the local unit over land telephone lines. Additionally, as described below, in some systems the database is built remotely and the guide itself is transmitted to the local unit.

Figure 1D:
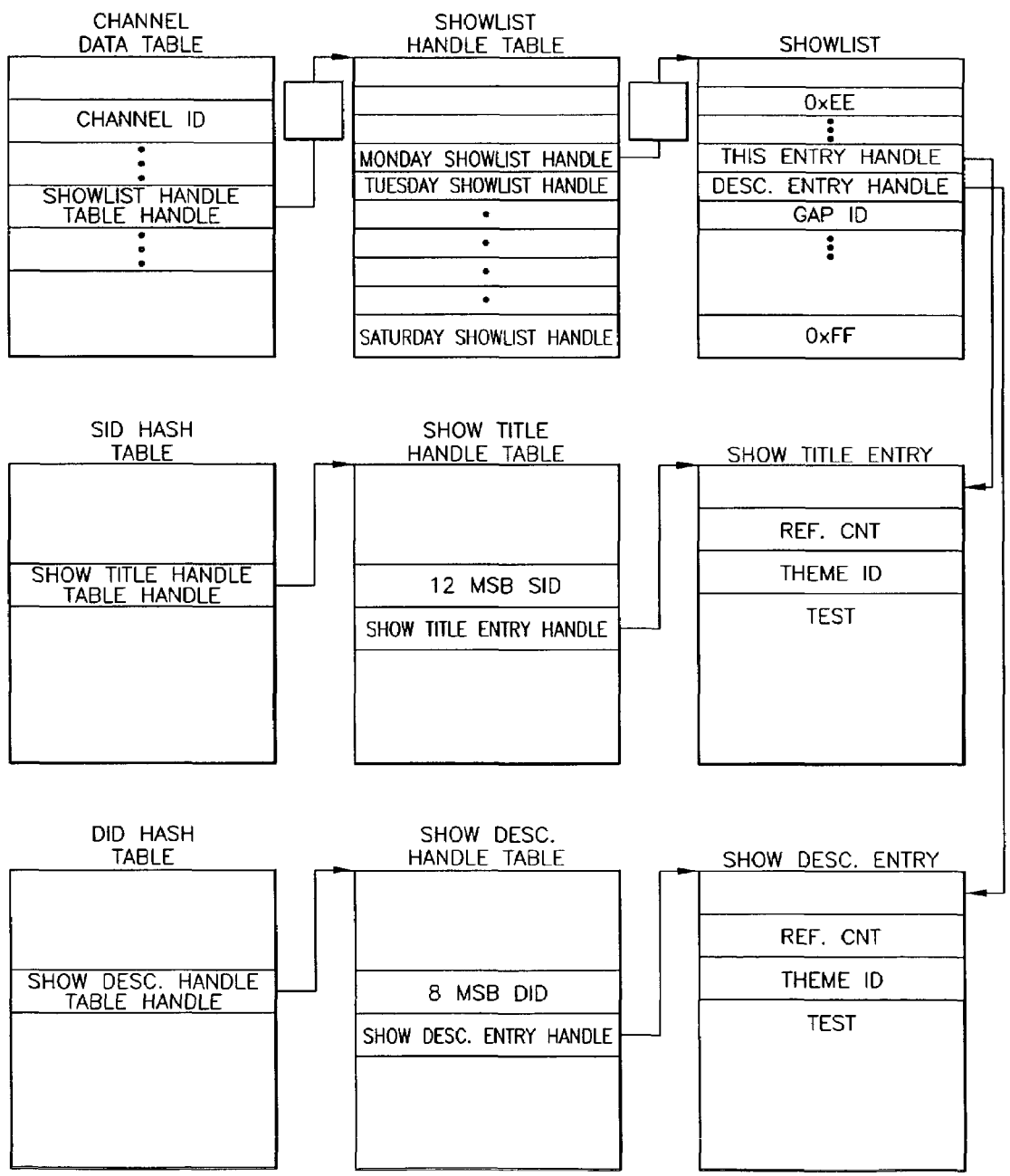
FIG. 1D is a chart that illustrates the hierarchical structure of an embodiment of a database built by the database engine.

The DBE builds a hierarchical database in the RAM. The hierarchical structure of the database is depicted in FIG. 1D. As shown, the database is structured internally as schedule data structures and theme data structures linked by handles and handle tables. Each handle is an index to a handle table which contains pointers to blocks of memory where items of the database are stored.

In another embodiment, for example in a DSS system, program guide data is transmitted as a bit stream that is processed by the database engine. Additionally, a N.E.W.S. (new, entertainment, weather, and sports) database has been developed. Commands including story text and story IDs are transmitted. Links from the program guide to stories related to a program can be created and the related stories can be accessed from the guide.

An advertisement (ad) database is also created from commands including advertising text and logos including IDs for linking the ads to shows displayed in the EPG. The user may therefore access the advertising information directly from the guide.

An internet database is also created from commands including URLs to internet sites related to programs displayed on the EPG. If the viewer is viewing the EPG on a platform that is Web enabled, e.g., WebTV, a PC, or PCTV, then a linked site can be accessed directly from the EPG.

Additionally, a graphics program module builds various displays utilizing schedule, show title, new channel, and other information from the database. If the OSD controller operates in the character mode, the display is a grid of character codes that are transferred to the OSD controller, which generates the on-screen display.

An input-response user interface program module responds to user input to generate new displays responsive to the particular input. In one preferred embodiment, the user utilizes an input device, e.g., a remote control unit, mouse, or keyboard, to place a pointer over a part of the current display and "clicks". The input-response module responds to the position of the pointer and the particular display currently displayed to generate a responsive display or take a particular action. In another preferred embodiment the user interface responds to function buttons on a remote control unit. Specific examples will be described below.

B. Board Description

FIG. 1C is a block diagram of an embodiment of the electronic hardware unit utilized to perform the electronic on-screen schedule display and other functions. The particular circuit disclosed is for TVRO (TV Receive Only) customers having home satellite dishes for television viewing. This unit is coupled in series with existing customer TVRO equipment.

In FIG. 1C, the unit receives Baseband Video in 123 from the customer TVRO system. The unit optionally outputs Baseband Video out 128 or channel ¾ RF out 130. The unit includes an 8-bit microprocessor 100, 64 bytes of code ROM 101, 512 K of RAM 102 for program data storage, a custom gate array 103, segmented base registers 104 for fast memory data manipulation, security logic 106 for decoding incoming encrypted data, a serial bus 108 for display controller interface, serial bus 110 for inter-processor communication, watchdog timer 112 for error recovery, IR input 113, IR transmitter circuits 116 for TV, VCR control, IR output 117, CRC-32 encoding and decoding logic 118, on-board power supply 120, video input 123, On-Screen Display Controller and Formatter 124, custom color converter 126, RF modulator 127, Baseband Video output 128 and RF output 130.

The on-screen display controller and formatter (OSDCF) 124 functions as an I/O controller, an on-screen display controller (OSD), and also as a closed-caption data (CCD) VBI data slicer. The VBI is a dead space in a TV signal that allows a television signal to reposition the scanning electron beam from the bottom to the top of the screen. Digital data, for example close-captioned data, is modulated onto the carrier signal during the VBI.

The OSDCF 124 includes an analog to digital convertor (ADC) which digitizes the incoming baseband video and extracts digital information transmitted in the VBIs. As explained more fully below, messages for transmission to the database are transmitted in the VBIs. These messages are transferred to processor 100, which executes a database engine process to build or update the database.

The OSD part of the OSDCF 124 includes cache memory, character memory, timing functions, and an external RAM. The OSD reads high level graphic commands sent from the processor 100 and stores graphic information in the RAM. The OSD outputs red (R), green (G), blue (B), graphic data which is used to generate a local video signal. Depending on the state of the user input interface, described below, the OSD local video output or the incoming live video will be displayed.

Accordingly, screen display graphic data generated by the database engine is transferred to the RAM of the OSD, which generates a local video that causes the display screen to be displayed on the television screen.

C. Scheduling Data Structures

As mentioned, the DBE builds a hierarchical database in the RAM. In one embodiment, the hierarchical structure of the database is as depicted in FIG. 1D. As shown, the database is structured internally as schedule data structures and theme data structures linked by handles and handle tables. Each handle is an index to a handle table which contains pointers to blocks of memory where structures of the database are stored.

The hierarchy for the schedule data structures, in descending order is as follows:

| | |
|---|---|
| Channel Data Table: | contains subscriber unit's list of channels (including newly available channels); |
| Show List: | contains time slots for each show scheduled to be broadcast for a channel; |
| Show Title: | contains the title text and show title attributes; |
| Show Description: | contains show's ratings, attributes, and description text. |

A channel data table, depicted in FIG. 1E, is the highest data structure in the hierarchy. This table includes an entry for each channel received by the subscriber unit. The entries in the channel data table are usually changed infrequently and are determined by the location of the subscriber unit and type of services received. Each channel data table entry includes information concerning the channel and a handle to a show list handle table for the channel.

The next data structure in the hierarchy is the show list depicted in FIG. 1F. The show list includes a start time typically being midnight GMT and 24 hours of scheduling. The channel's schedule is given by an ordered sequence of show slots, with a show slot for each show to be broadcast by a particular channel for a particular day. Each slot includes a duration, show title handle, and show description handle. Finding an entry corresponding to a given start time requires scanning the entries, in order, from the beginning of the show list and adding duration values.

The database, when fully constructed, holds a week's worth of show lists for each channel. The days of the week are accessed by incrementing the show list handle by two bytes. The show lists are updated each day at midnight GMT with the show list for the day just completed being deleted and the show list for the same day next week being added to the database.

Figure 1H:
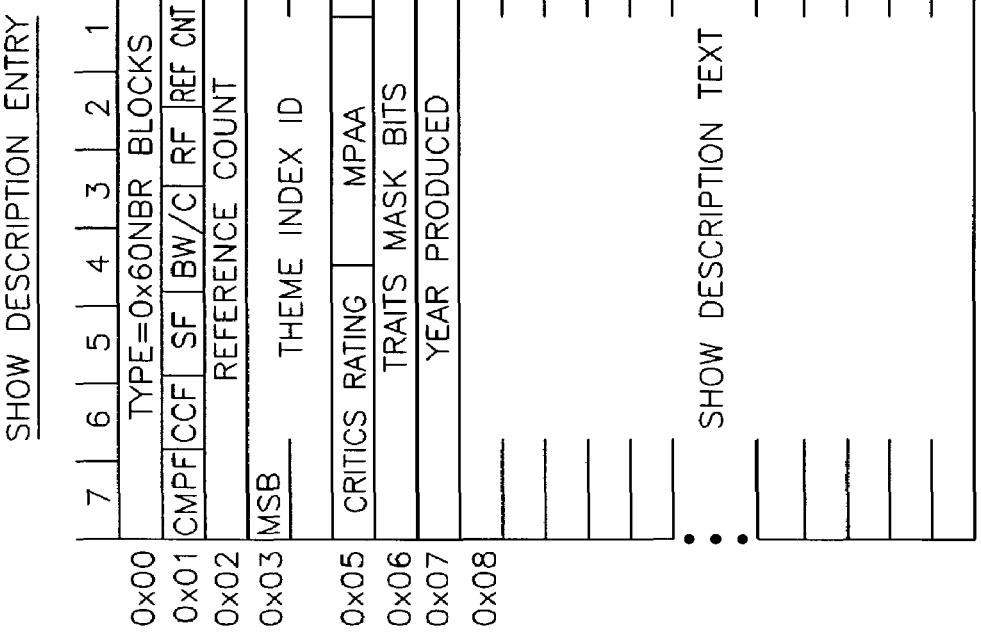
FIG. 1H illustrates exemplary show description entries.
Figure 1G:
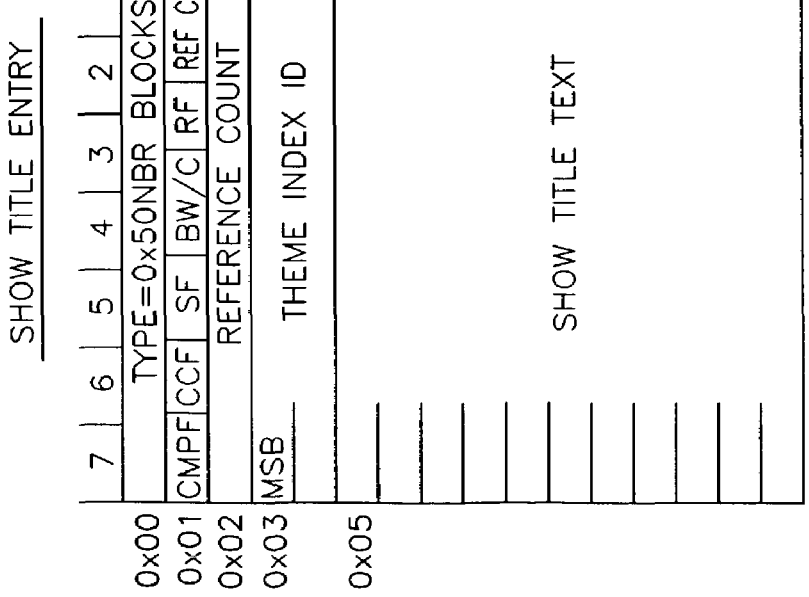
FIG. 1G illustrates exemplary show title entries.

The next data structures in the schedule hierarchy are the show title entries, depicted in FIG. 1G, and the show description entries, depicted in FIG. 1H. For a given show slot, the show title entry and show description entry are accessed utilizing the handles included in the slot. The show title and show description entries are stored in a memory pool divided into blocks. Each show title is identified by a unique 20-bit show identification number (SID), and each show description is identified by a unique 20-bit number assigned at the head end. The show title handles are based on the SID and the show title handles are offsets into a show title handle table. The entry in the show title table accessed by a particular show title handle includes the address of the first block in the memory pool where the show title entry is stored. Similarly, the show description handle table entry accessed by a show description handle stores the address of the first block in the memory pool where the show description entry is stored.

Each show title entry includes theme index ID and the text of the show title. Typically, a single show title entry will be referenced by many show lists for different channels, days, and times. Thus, by utilizing handles in the show lists, all show lists reference a single show title entry in memory so that memory is efficiently used. Many show title entries have a long life because the show titles may be for series that are broadcast over long periods of time and may be referenced by many showlists since many shows are broadcast by multiple channels.

Each show description entry includes a theme index ID, critics rating, MPAA rating for the show, traits mask bits, year produced, and show description text. Show description entries tend to have a shorter life than show title entries because a description is only valid for a particular episode of a series.

D. Schedule Search

To obtain schedule information for a particular time and to display the schedule information in the programming grid requires the following steps. For each channel in the channel list, the show list for the day is accessed and scanned. Horizontal blocks for the channel are sized according to the duration of the show slots including and following the selected time. The show title entry referenced by each show slot is accessed and the show title is displayed in the horizontal block corresponding to the show slot.

E. Theme Data Structures

A powerful feature of the database is the ability to group shows by theme. The theme IDs stored in the show title and show description entries are utilized to match particular shows to particular themes. For example, a viewer may want to see a listing of all comedy movies.

Each primary category, movies in the example above, has a theme category entry included in a theme category table, depicted in FIG. 1I. A theme category entry includes a theme category ID, a handle for the subcategory handle table, and the theme category name. The theme category ID is used to identify theme sub-categories, comedy in the example above, for this primary category.

There is a theme sub-category table, depicted in FIG. 1J, for each primary category. The table contains entries for each theme sub-category contained in a primary theme category. Each table entry includes the theme IDs corresponding to the sub-category entry and the name of the sub-category.

F. Theme Search

When the viewer initiates a search for a particular type of show, for example a comedy movie, each channel is inspected and theme IDs of each show listed are compared to theme IDs stored in the comedy entry of the theme sub-category table corresponding to the movie primary category entry. Information about shows with matching theme IDs is stored in a theme search data structure in a user interface local buffer.

The theme search function requires two calls to the database. The first of these calls initializes the theme search data structure to the first show that matches the theme category for a specific channel entry, including the show's time offset from the search time. The second call will find the next matching show after a particular offset time, update the theme search data structure and return the starting offset of this next matching show.

The basic algorithm for the theme user interface access is as follows:
1. For a given starting time, for each channel entry, find the first show that matches the theme criteria on or during this time and create a list. Keep track of the channels that had matches;
2. Sort the list of shows in time order;
3. Find the channel with the earliest show in the sorted list;
4. Place this earliest show into the user interface search list;
5. For the channel with the earliest show, request the next show that matches the theme criteria and updated offset time; and
6. Repeat steps 2-4 until all shows have been located or other specified limit is reached (i.e. search may be for a limited number of matches).

The shows for the selected category are then displayed in time order.

G. Ad Data Structures

An ad list data structure is similar to the show list. It includes a start time and 24 hours of ad scheduling. The ad list is regionalized and includes an ad slot for each ad to be broadcast for a given day. The ad slot includes a duration and an Ad ID utilized to access an ad entry.

Each ad entry includes an ad banner text field, an ad text field, and a pointer to an ad logo, if appropriate. The ad logo includes a graphics file to be displayed with the ad. The ad entries include the ad banner text, and the ad text.

H. Building the Database

The database is built by a database engine software module operating on the processor. Messages comprising discrete commands are received by the database engine. Examples of commands include a Region Command that specifies channels available for a particular subscriber unit (or service package) to be included in the Channel Data Table; a New Channel Command that specifies any newly available channels for a particular subscriber unit (or service package); a Channel Data command including information utilized to form the entries in the Channel Data Table; and Showlist, Show Title, and Show Description commands including SIDs and DIDs referencing areas in memory. The database engine selects only Showlist Commands relevant to channels included in the Channel Table for further processing.

The database engine creates storage locations in memory for all SIDs and DIDs included in any Showlist. Information included in commands having matching SIDs or DIDs is written to the referenced memory area. In practice the SIDs and DIDs are processed by a hashing system for more efficient searching.

The messages may be transmitted to a subscriber unit in various ways. A system for receiving messages in the VBIs of broadcast programming has been described above. In a DBS system the messages may be transmitted in a dedicated bit stream. In a DBS system video baseband signals are digitized, compressed, and modulated onto analog carrier signals. Because of advances in the art of compression, a carrier once used to transmit a single program can now transmit four programs. Typically, in addition to video signals, other bitstreams encoding information such as audio, VBI (vertical blanking information data such as closed caption and teletext), program guide information, and conditional access information, are provided as separate bitstreams, multiplexed into a composite bit stream, and modulated onto a carrier signal.

Alternatively, the database itself may be transmitted in a digital data stream. Typically, a digital data stream includes headers for classifying different portions of the data in the stream. The data stream transmitted from a satellite includes video data in the format specified by the Motion Picture Expert Group (MPEG) standard, MPEG audio data, and EPG data. The MPEG video and audio data is decoded and transformed into signals which may be utilized by a television, monitor, or other display devices. The EPG data is stored in a buffer and utilized by a controller to generate an EPG display and to tune to correct programs specified by user input data.

Figure 1K:
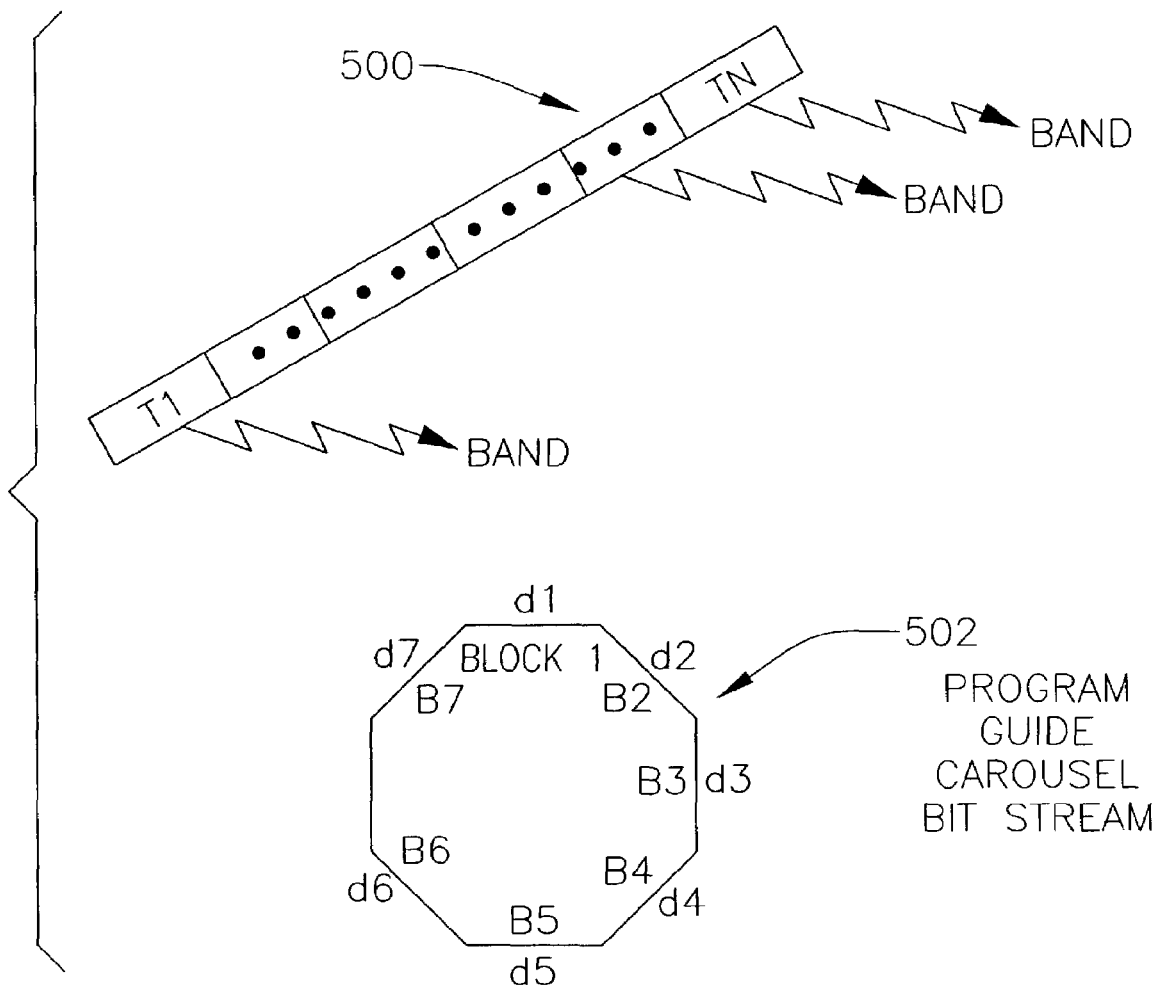
FIG. 1K illustrates a transmission scheme of a satellite that has several transponders simultaneously transmitting on different bands.

For example, in DSS, the program guide information is transmitted in blocks of 3 hours of programming for 36 channels. Programming is digitally modulated onto different bands. As depicted in FIG. 1K, a satellite has several transponders 500 simultaneously transmitting on different bands. Several channels can be modulated onto a single band utilizing digital compression techniques. A bit stream including the current programming is carried by all bands. However, future programming for different blocks of channels is transmitted on different bands. The blocks are transmitted in a carousel 502 or endless loop so that there may be a delay before a particular time band is received.

A decoder at the viewer's location receives 16 carriers and controls a tuner/demodulator to select one carrier. The carrier is sampled, decoded, error-corrected, and demultiplexed to separate the various bit streams. The decoder includes one or more video decoder chips which decompress compressed video to reconstruct pictures of virtually any size.

When the viewer accesses the guide, the block for that time period is loaded into memory so that the user can interact with the guide. For a future time and different channel there may be a time delay. For example, if the current programming block were B1 and the block currently received is B4 the user must wait for blocks B5, B6, and B7 to be transmitted before the current programming can be received and displayed. The viewer would wait for a time delay equal to the sum of time durations for transmitting each block, i.e., d5+d6+d7. If the program guide block is modulated onto a different band, the cable box must tune to the band and wait until the desired block is transmitted on the carousel. Hence, if the guide is accessed for future programming, there could be a delay.

For cable, the database is built at the SST head end and sent over land-lines to the cable head end. The cable company can send data anyway they want, for example, via VBI's satellite, digital data bit stream, and the like.

I. User Interface

The guide user interface (GUI) takes remote control commands as its primary input. In one embodiment, a user requests various functions by pressing function buttons on a remote control. In another embodiment, the GUI is utilized with different interactive regions on a display screen corresponding to different functions. The user moves the cursor over the interactive region corresponding to a desired function and selects the function to generate a command. The particular form of entering a command is not critical and technology for utilizing voice commands may soon be available.

The user interface receives commands and responds with a requested display screen and by performing the function requested by the command. The function performed may be an action such as recording a program, tuning to a channel, displaying a list of new channels, accessing a related internet site, purchasing a pay-per-view program, or purchasing merchandise. The data and format of each screen is dependent on the previous screen, time of day, the contents of the database, the command received, and other parameters. A state table is used to define the screen flow.

For every defined screen, there is an entrance function, an exit function, an update function, and an array of request-handling functions. The entrance function is called when a state is first entered to collect all necessary data and format the screen. The exit function is called to release memory and data for the screen. The update function is called once per minute to update the screen time and to redraw the screen of any information displayed on the screen needs to be updated.

Once in a particular state, the table contains a reference to another software function corresponding to each key on the remote control or to each interactive region on the screen. These referenced functions will be executed whenever an associated remote control button is pressed or interactive region is selected.

For example, if the user wishes to record a program, in the GUI embodiment, the viewer may move the cursor over to the record interactive region, which is then selected to request that the recording function be performed. A confirmation screen will then be generated. Once the user confirms the recording request, an entry is made in a recording queue. A record daemon is then called from the real-time executive to examine the queue and manage recording functions.

The screens are displayed by an on-screen display (OSD) controller based on graphic display commands issued by the database engine. Among the commands needed to draw system display screens are the Erase Screen Command, Draw Rectangle Command, Save Rectangle Command, Restore Rectangle Command, Move Rectangle Commands, Write ASCII String Command, and Draw Channel Icon Command.

Each screen includes areas that are constant (which are based on code and data stored in non-volatile memory), and variable areas such as show titles and descriptions and channel descriptions which utilize data stored in the database. As described above in the description of the database engine, the database is structured to facilitate efficient searching for information, generally in the form of the ASCII text strings, stored in the database. In addition, graphics files are also being stored in the database to be displayed in windows of the display screen.

J. New Channels and Services

Information broadcast to the receiving peripheral devices via satellite 15 or via lines 19 and 13 includes television schedule information and information about new channels and features. Software applications located within the peripheral devices use the schedule information to generate a schedule guide. In addition, the software applications also determine whether any new or previously unavailable channels or services have become available by determining whether a New Channels Command has been received, for example. The DBE creates a New Channel data structure including a new channel and services data table with handles to channel and service descriptions.

Figure 2:
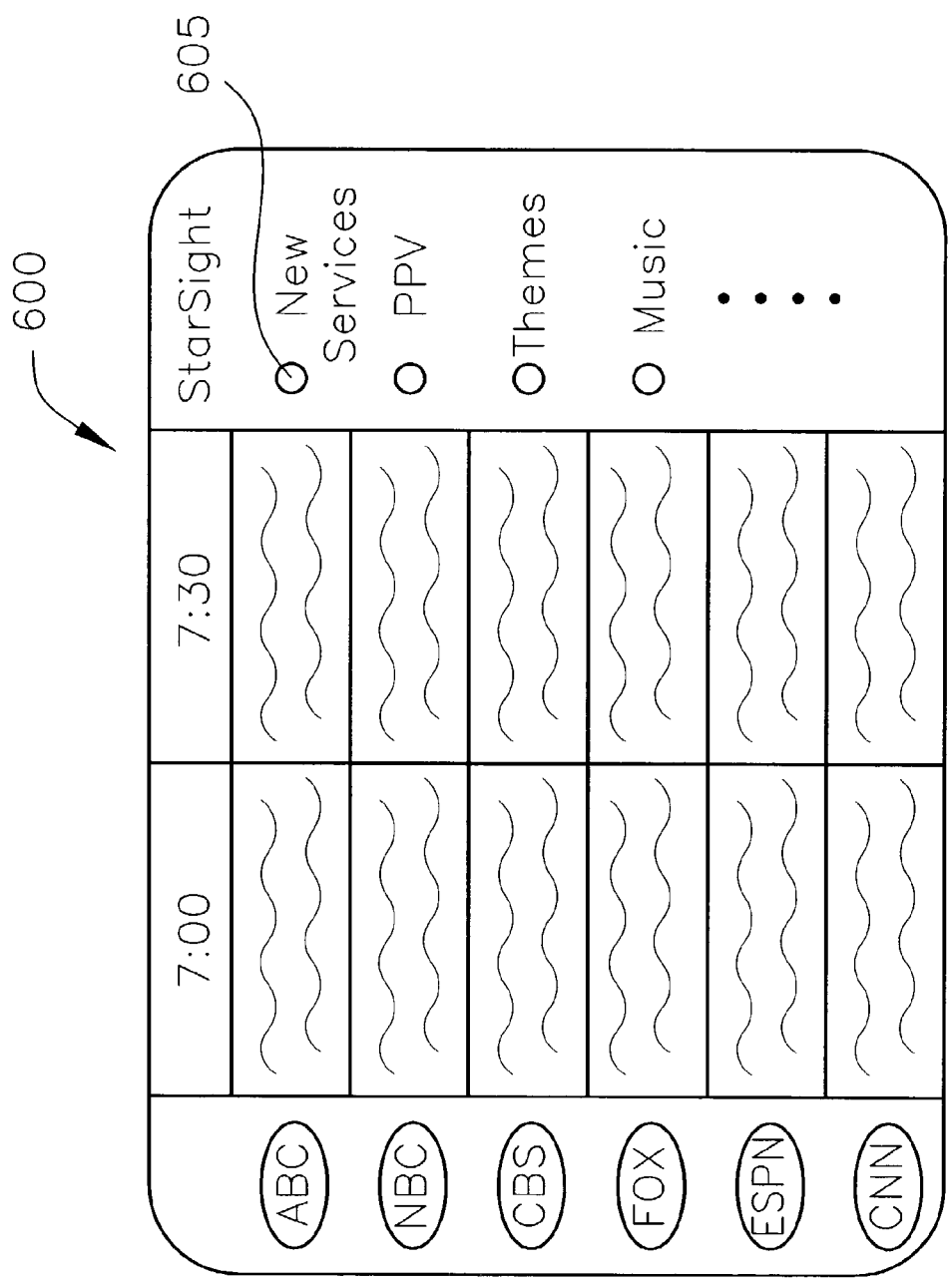
FIG. 2 illustrates an exemplary schedule guide including an interactive New Services button according to the present invention.

FIG. 2 illustrates an exemplary schedule guide 600 including an interactive New Services button 605 according to the present invention. In a preferred embodiment, New Services button 605 is presented on guide 600 only when the data stream indicates that new channels and services are available. If the television signal is transmitted in digital form as packets of data, the header of packets that carry a new service could include a unique signature that designates the new service. The microprocessor monitors the headers of the packets for the unique signature and displays the New Services button 605 only when the signature is detected. Schedule guide 600, in a preferred embodiment is an interactive schedule guide. A viewer is able to select various interactive regions of schedule guide 600, such as button 605, using any pointing device such as a mouse or remote control unit as is well known, or any other selecting device such as a keyboard, touch-screen, light pen or the like. The viewer simply highlights the New Services selection button 605 and presses the Select button or similar function key. Once New Services button 605 is selected by the viewer a screen appears, including a list of any new channels or services, either) as a pop-up or as an overlay screen.

Alternatively, New Services button 605 is displayed whether or not the data-stream indicates that new channels are available. In this embodiment, if there are no new channels available, the list mat be blank when New Services button 605 is selected.

Figure 3:
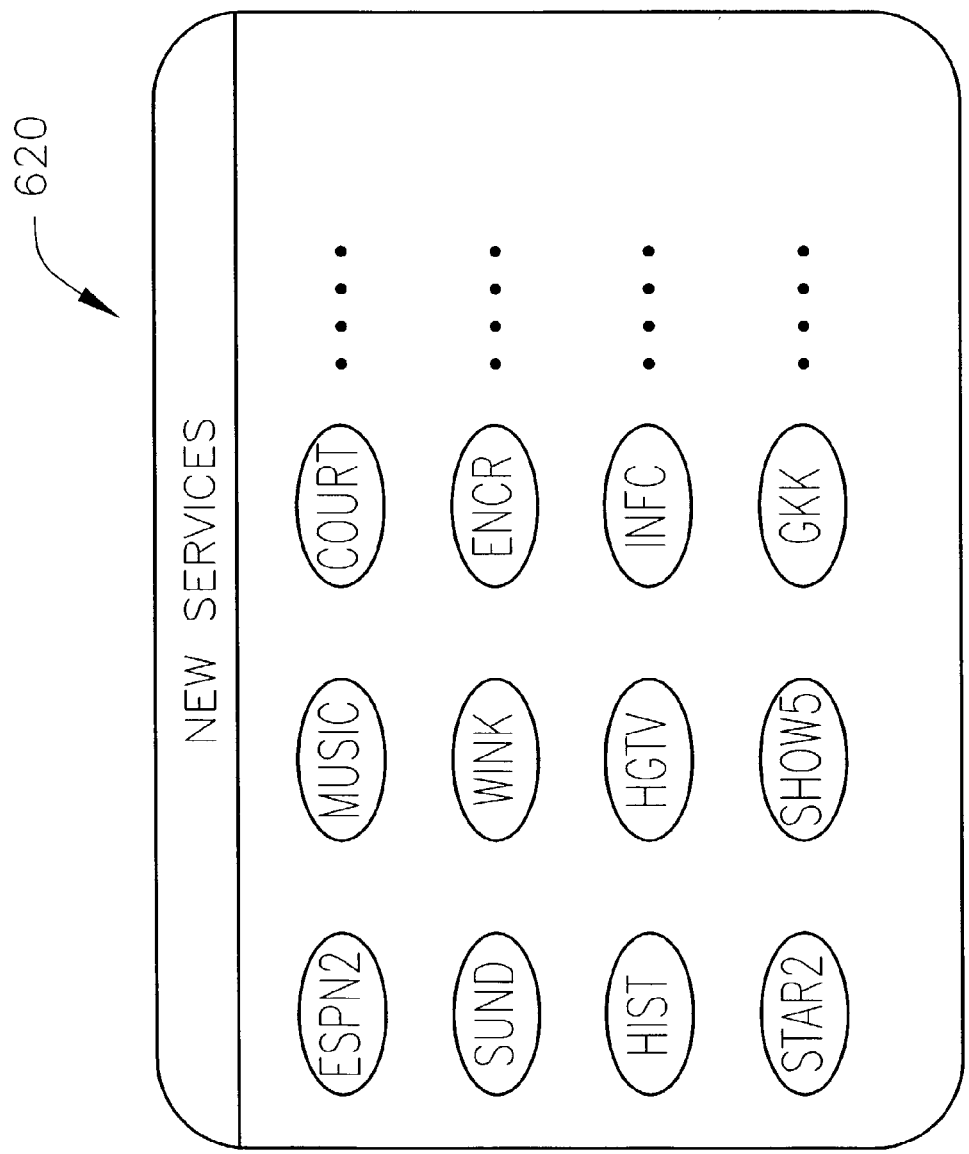
FIG. 3 illustrates an exemplary screen with a listing of new channels and services according to the present invention.

FIG. 3 illustrates an exemplary listing screen 620 of new channels and services according to the present invention. Listing Screen 620 as shown is an overlay screen covering the whole guide screen, but it may be a partial overlay screen or pop-up screen of any desired dimension. Listing screen 620 presents new channels and services the cable operator has added recently, or a viewer is able to get for the first time. For example, as shown, listing screen 620 presents the new channels using interactive selection regions with the channel call letters displayed therein. Alternatively, the new channels may be presented using an icon or with the channel number, or any combination as desired. After screen 620 is presented, the viewer can select a new channel or service by highlighting and selecting as above. Once selected, a description of the new channel or service is presented as an overlay or a pop-up screen.

Figure 4:
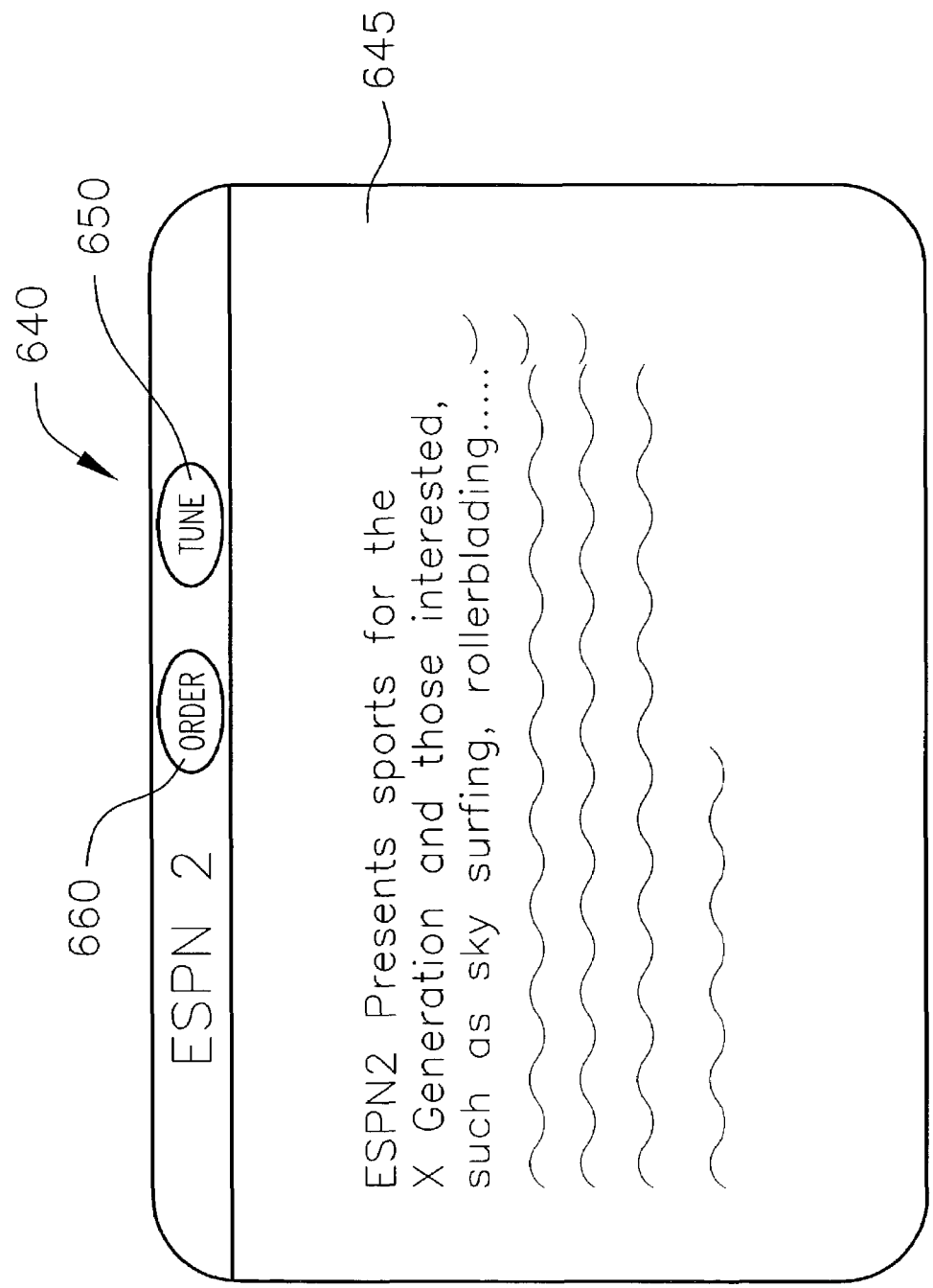
FIG. 4 illustrates an exemplary description screen for a selected new channel according to the present invention.

FIG. 4 illustrates an exemplary description screen 640 for a selected new channel according to the present invention. Description screen 640 includes a description area 645. Description area 645 includes description text describing the typical subject matter broadcast on the selected channel. A description area can also include icons, advertisements and the like. Additionally, interactive URLs can be include in a description area to link viewers to internet sites operated by the channel and service providers to obtain more information, for example.

In one embodiment, description screen 640 also includes a tune button 650. A viewer can tune directly to the selected channel by highlighting and selecting tune button 650. Alternatively, the viewer is able to tune directly by selecting a portion of the description or from a call letter icon or a channel number representation, for example.

In another embodiment, description screen 640 also includes an order button 660. For this embodiment it is assumed that there is a backlink to the cable headend. If the viewer highlights button 660, an order is sent to the headend to enable the viewer to subscribe to and receive the new service that is highlighted.

While a full and complete disclosure of the invention has been provided hereinabove, it will be obvious to those skilled in the art that various modifications and changes may be made. Accordingly, the disclosures and descriptions herein are illustrative, but not limiting, of the scope of the invention which is set forth in the following claims.

The invention claimed is:

1. A method for indicating availability of a new service on a cable television network comprising:
    displaying a television schedule guide on a display;
    determining the availability of the new service;
    displaying an icon in the television schedule guide to indicate the availability of the new service only in response to determining that the new service is newly available;
    receiving a user selection of the icon; and
    displaying a list of only services that are available to the user for the first time on the display in response to receiving the user selection of the icon.

2. The method of claim 1, wherein the icon is displayed after the availability of the new service is determined.

3. The method of claim 1, further comprising: selecting a service from the list of services; and
    displaying a description of the selected service in response to a user command.

4. The method of claim 3, wherein the description of the service is displayed on the display in place of the list of services.

5. The method of claim 1, wherein the list of services is displayed on the display in place of the television schedule guide.

6. The method of claim 1, wherein the list of services includes at least one of a new television service and a new television channel.

7. The method of claim 1, wherein the list of services includes at least one of a new information service and a new channel.

8. The method of claim 1, wherein the new service is one of a new television service and a new channel.

9. The method of claim 1, further comprising ordering one of the services from the displayed list of services in response to a second user command.

10. The method of claim 1, wherein determining the availability of a new service includes monitoring transmitted data packets.

11. The method of claim 10, wherein determining the availability of a new service further includes detecting a unique signature designating the new service.

12. The method of claim 11, wherein the unique signature is included in a header of each of the data packets.

13. The method of claim 1, wherein determining the availability of a new service includes receiving a new channels command.

14. The method of claim 1, further comprising tuning directly to one of the services in response to a second user command.

15. The method of claim 1, wherein the icon includes at least one of channel call letters and a channel number.

16. The method of claim 1, wherein displaying the list of all newly available services include displaying, at once, a list of all of new channels and services that are available on the cable television network.

17. The method of claim 16, wherein the newly available channels and services are not contextually related.

18. A system for displaying information on a monitor comprising:
    a display;
    a display controller configured to display a television schedule guide on the display;
    a memory for storing television schedule information; and
    a processor coupled to the memory and the display controller, the processor configured to process the television schedule information, determine the availability of a new service, display an icon in the television schedule guide indicating the availability of the new service only in response to determining that the new service is newly available, receive a user selection of the icon, and display a list of only services that are available to the user for the first time in response to receiving the user selection of the icon.

19. The system of claim 18, wherein the processor is further configured to display the icon in the television schedule guide after determining the availability of the new service.

20. The system of claim 18, wherein the processor is further configured to receive a user selection of a service from the list of services, and display a description of the selected service.

21. The system of claim 18, wherein the list of services includes at least one of a new television service or a new television channel.

22. The system of claim 18, wherein the list of services includes at least one of a new information service or a new channel.

23. The system of claim 18, wherein the processor is further configured to monitor transmitted data packets in determining the availability of a new service.

24. The system of claim 23, wherein the processor is further configured to detect a unique signature designating the new service in monitoring transmitted data packets.

25. The system of claim 24, wherein the unique signature is included in a header of each of the data packets.

26. The system of claim 18, wherein the processor is further configured to receive a new channels command.

27. The system of claim 18, wherein the processor is further configured to tune directly to a selected one of the new television service and the new television channel.

28. The system of claim 18, wherein the icon includes at least one of channel call letters and a channel number.

29. In a system with a memory and a processor coupled to the memory, a display controller coupled to the processor wherein the display controller displays data including a television schedule guide, an icon to indicate the availability of a new service detected on a cable television network, the icon displayed in the television schedule guide only in response to determining that the new service is detected, and a list of only services that are available to the user for the first time displayed in response to receiving a user selection of the icon.

30. An apparatus for displaying information on a display comprising:
   means for displaying a television schedule guide on a display;
   means for storing television schedule guide information; and
   means for processing the television schedule guide information including a television schedule guide, an indication means to indicate the availability of a new service, the indication means displayed in the television schedule guide only in response to determining that the new service is detected, a list of only services that are available to the user for the first time displayed in response to receiving a user selection of the indication means.

31. The apparatus of claim 30, further comprising:
means for selecting a service from the list of services; and
means for displaying a description of the selected service.

* * * * *